No. 776,222.

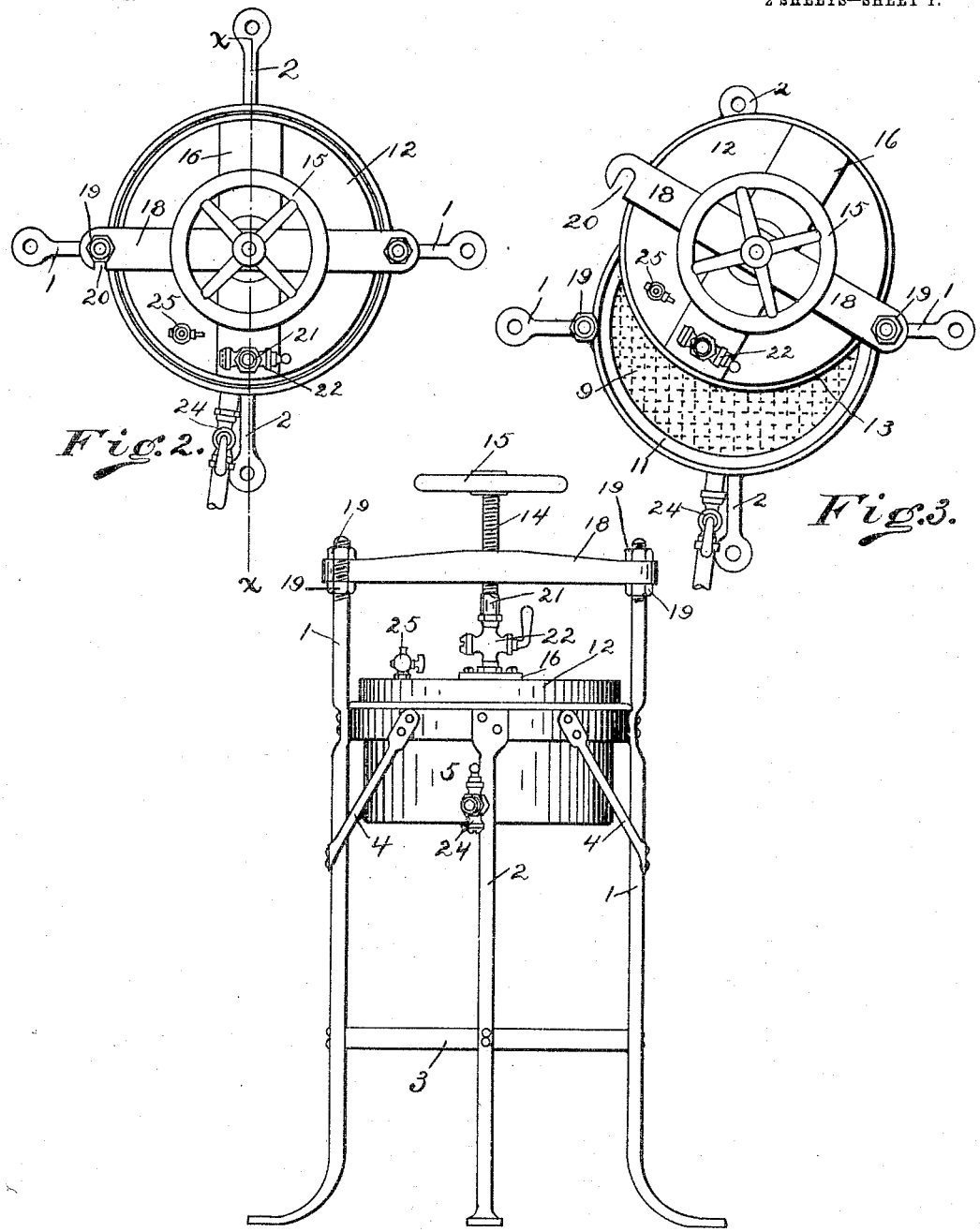

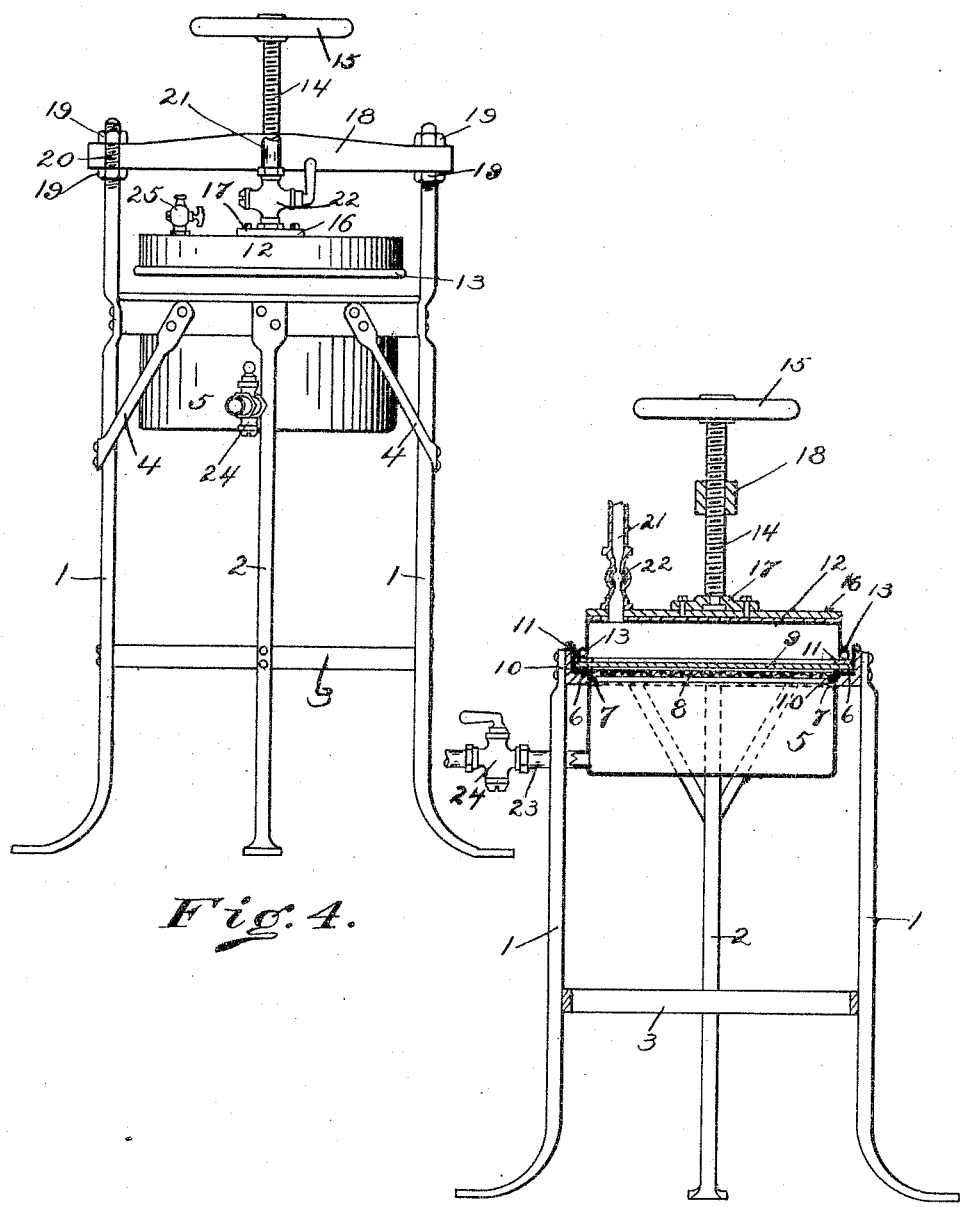

Patented November 29, 1904.

UNITED STATES PATENT OFFICE.

SAMUEL G. DERHAM, OF CINCINNATI, OHIO.

PRESSURE-FILTER.

SPECIFICATION forming part of Letters Patent No. 776,222, dated November 29, 1904.

Application filed September 6, 1904. Serial No. 223,450. (No model.)

*To all whom it may concern:*

Be it known that I, SAMUEL G. DERHAM, a citizen of the United States, residing in Cincinnati, county of Hamilton, and State of Ohio, have invented certain new and useful Improvements in Pressure-Filters, of which the following is a full, clear, and exact description, reference being had to the accompanying drawings, forming part of this specification.

My improvements relate to filters in which filtering-cloths are used as the filtering medium; and the purpose of my invention is to provide a cheap and effective filter for the filtering of whisky and the like in which the filtering medium may be readily removed for cleaning or replaced with a fresh filtering-pad; and it consists of that certain novel construction and arrangements of parts to be hereinafter particularly pointed out and claimed.

In the drawings, Figure 1 is a side elevation of my improved filter ready for use. Fig. 2 is a top plan view of same. Fig. 3 is a plan view of the filter, showing the top cover partly open. Fig. 4 is a side elevation with the top cover raised. Fig. 5 is a central vertical section on the lines $x\ x$ of Fig. 2.

1 1 and 2 2 are standards for supporting the filter, braced by the band 3, to which the standards are riveted. Secured in the upper portion of this framework by riveting or otherwise and suitably supported by side braces 4 4 is an open pan or receptacle 5. This pan and, in fact, all of the metal parts coming in contact with the liquid where whisky and the like is to be filtered, it will be understood, is preferably copper-plated, and the capacity of the receptacle when intended to be used for whisky and the like is sufficient to hold from two to three gallons of the liquid, so that the filtered liquid may be drawn off into bottles as desired directly from the filter, but so that the filter will not contain more than the number of gallons allowed by law to be filtered at a time. The upper portion of this receptacle 5 is widened out to provide an annular flange 6, while inside this flange a bead or ledge 7 is formed, which ledge supports a wire sieve 8 of wide mesh, but sufficiently rigid to stand the strain to which it is subjected.

9 is a disk of filtering medium, preferably of the kind described in my Patent No. 754,053, dated March 8, 1904.

10 and 11 are annular gaskets of rubber or other suitable material, arranged above and below the filtering-pad in order to form a tight joint when the upper pan or cover 12 is pressed to place. This cover is of slightly less diameter than that of the upper portion of the lower receptacle, so that it will fit inside the lower receptacle. The rim of the cover is provided with a bead or flange 13, so that the gaskets may be suitably compressed to make a tight joint, which pressure is obtained by the screw 14, operated by the hand-wheel 15. The cover is suitably strengthened by the plate 16, and the bearing end of the screw is secured by the plate 17 to the cover. The screw takes through the cross-bar 18, secured by the nuts 19 on top of the standards 1 1, which are extended for that purpose. One end of this cross-bar 18 is slotted at 20, so that by releasing the nut the bar, and with it the screw and top cover 12, may be swung out of the way, so that easy access may be had to the filtering-pad 9.

21 is the supply-pipe for introducing the liquid to be filtered into the filter and provided with the stop-cock 22.

23 is the draw-off pipe for removing the filtered liquid, provided with the stop-cock 24.

25 is the air-vent, with suitable valve for opening and closing to equalize the pressure within the filter-chamber.

Instead of a single pad of filtering material a plurality of pads may be used one on top of the other, with rubber gaskets between each pad.

The operation of the filter will be evident from the foregoing description. The filtering-pad being located in place and the cover being brought to a position over the flange upon which the pad rests with the rubber gaskets in place, the cover is lowered and the rim-flange brought tightly to place by the hand-screw. The induction-pipe 21 is suitably connected with the receptacle containing the liquid to be filtered. The air-vent 25 is open to relieve the air-pressure, and the liquid is then run into the upper chamber of the filter, the air-vent closed, and the liquid filters through the filtering medium under the pressure of the head of the liquid. When the lower receptacle is filled with the liquid, it is run off into bottles or otherwise through the eduction-pipe 23, the stop-cock 22 closed, and the air-vent again opened to allow the air-pressure to force out the liquid remaining above the filtering-pad.

Should there be any leak around the edge of the filtering-pad, the lower receptacle being larger than the cover the screw can be tightened and the leak stopped without any waste of the liquid. By raising the cover by the hand-wheel and loosening the nut 19 the upper part of the filter can be swung out of the way for the insertion of a fresh filtering-pad or for cleaning. Ready and instant access may be had to the inside of the filter, so that all sediment may be easily removed. The large filtering-surface presented by the pad, which it will be understood is supported from sagging by the wire mesh 8, permits a very rapid filtration.

Having thus described my invention, what I claim as new, and desire to secure by Letters Patent, is—

1. In a pressure-filter, the combination with suitable standards and a receptacle with eduction-pipe therefrom secured in said standards, of an internal flange in the upper portion of said receptacle, a flanged cover fitting within said receptacle, a flat pad of filtering material resting with its edges on the flange of the receptacle, a cross-bar mounted on the standards above the cover, and a hand-screw secured to the cover and taking through said cross-bar whereby the flange of the cover may be tightly clamped upon the internal flange of the receptacle, said cover having an induction-pipe to supply the filter with liquid.

2. In a pressure-filter, the combination with suitable standards and a receptacle with eduction-pipe therefrom secured in said standards, of an internal flange in the upper portion of said receptacle, a flanged cover fitting within said receptacle, a flat pad of filtering material resting with its edges on the flange of the receptacle, a cross-bar mounted on the standards above the cover, and a hand-screw secured to the cover and taking through said cross-bar whereby the flange of the cover may be tightly clamped upon the internal flange of the receptacle, said cover having an induction-pipe to supply the filter with liquid, and said cross-bar being slotted at one end to permit the cover to be swung to one side for ready access to the filter.

SAMUEL G. DERHAM.

Witnesses:
C. M. FAHNESTOCK,
ALFRED M. ALLEN.